United States Patent

Muwafi et al.

[11] Patent Number: 5,978,822
[45] Date of Patent: *Nov. 2, 1999

[54] CIRCUIT FOR ROTATING, LEFT SHIFTING, OR RIGHT SHIFTING BITS

[75] Inventors: Jumana A. Muwafi, San Francisco, Calif.; Gerhard Fettweis, Dresden, Germany; Howard W. Neff, Castro Valley, Calif.

[73] Assignee: Atmel Corporation, San Jose, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/581,047

[22] Filed: Dec. 29, 1995

[51] Int. Cl.$^6$ ....................................................... G06F 7/00
[52] U.S. Cl. ................................. 708/209; 712/220; 712/1
[58] Field of Search ............................... 395/800, 800.01, 395/561, 564, 800.32; 364/715.08, 715.01; 708/209; 712/220

[56] References Cited

U.S. PATENT DOCUMENTS

| | | | |
|---|---|---|---|
| 4,556,978 | 12/1985 | Kregness et al. | 371/49 |
| 4,807,172 | 2/1989 | Nukiyama | 364/715.08 |
| 4,829,460 | 5/1989 | Ito | 364/715.08 |
| 5,144,573 | 9/1992 | Greiner | 364/738 |
| 5,155,698 | 10/1992 | Niimi | 364/715.08 |
| 5,262,971 | 11/1993 | Yamaguchi | 364/715.08 |
| 5,379,240 | 1/1995 | Byrne | 364/715.08 |
| 5,416,731 | 5/1995 | Dang et al. | 364/715.08 |
| 5,442,576 | 8/1995 | Gergen et al. | 364/715.08 |
| 5,477,543 | 12/1995 | Purcell | 370/112 |
| 5,481,746 | 1/1996 | Schiffleger et al. | 395/800 |
| 5,682,340 | 10/1997 | Arends et al. | 364/715.08 |

OTHER PUBLICATIONS

Newspaper article—Ashhok Bindra, "Two 'Lode' up on TCSI's new DSP core," Electronic Engineering Times, Jan. 16, 1995, pp. 1 and 12.

*Buyer's Guide to DSP Processors*, Berkeley Design Technology, Inc., 1995, title page and pp. 653–659.

*Primary Examiner*—Meng-Ai T. An
*Assistant Examiner*—Walter D. Davis, Jr.
*Attorney, Agent, or Firm*—Thomas Schneck

[57] ABSTRACT

A circuit having a single branch, which is controllable to implement either a left or right shift of bits of a data word. Preferably, the circuit is controllable to implement any selected one of the following operations: a left or right shift of bits of the word; and rotation (to the left or right) of bits of the word. In a preferred implementation, the circuit includes a set of multiplexer stages and circuitry for selectively inverting the order of the bits of the word input to, and the word output from, the set of multiplexer stages. Each of the multiplexer stages shifts the bits of the word it receives either by zero bits (in response to a first control signal), or by a positive number of bits (in response to a second control signal). By selectively controlling various subsets of the multiplexer stages, the bits of the input word can be shifted by any of a number of places (from zero to N, where N is some positive number). In another aspect, the invention is a circuit for rotating bits of an input word (by two or more bits to the left or right) during a single cycle, by duplicating the input word to form an extended word, shifting bits of the extended word, and selecting a subset of the shifted bits of the extended word. Other aspects of the invention are methods performed by, and a digital signal processor including, either embodiment of the inventive circuit.

15 Claims, 7 Drawing Sheets

CIRCUIT FOR ROTATING, LEFT SHIFTING, OR RIGHT SHIFTING BITS

FIELD OF THE INVENTION

The present invention relates to a method and circuit for rotating or shifting (to the left or right) bits of a data word, and to digital signal processing system including such a circuit.

BACKGROUND OF THE INVENTION

Many different implementations of a digital signal processor (DSP) are well known in the art. A conventional DSP typically includes at least one multiply and accumulate (MAC) unit since, for many signal processing applications the operations of multiplication and addition (accumulation) are frequently used, and an appropriately designed MAC unit (implemented as hardwired circuitry) can perform such operations efficiently.

A conventional DSP typically also employs two physically separate memory units: a program memory for storing instructions to be executed by the DSP; and a data memory for storing data to be processed (and optionally also data that has been processed) by the DSP as a result of executing the instructions. The program memory can be a read-only memory (ROM) or a random access memory (RAM) to which data can be written and from which data can be read. The data memory is typically a RAM to which data can be written and from which data can be read.

FIG. 1 is a block level diagram of a digital signal processor (DSP) having a program memory, a data memory physically separate from the program memory, and an arithmetic computational unit (ACU) 10 of the type which can be designed to implement the present invention. The DSP of FIG. 1 includes data memory 6 (connected to address buses AB0 and AB1 and to data buses DB0 and DB1), program memory 4, program control unit (PCU) 2, memory management unit (MMU) 3, arithmetic computational unit (ACU) 10, and input/output unit (IOU) 12.

In implementations preferred for some applications (such as that to be described with reference to FIG. 2), program memory 4 is a single port, read-only memory (ROM) with an array of storage locations 32 bits wide and 64K words deep, and data memory 6 is a dual port, random-access memory (RAM) with an array of storage locations 16 bits wide and 64K words deep. In such implementations, one port of dual port memory 6 can receive a 16-bit address (from 16-bit address bus AB0) and at the same time, the other port of memory 6 can receive another 16-bit address (from 16-bit address bus AB1). A control means is provided so that two simultaneous reads from memory 6, a simultaneous read from and write to memory 6, or a single read from (or write to) memory 6 can be performed.

MMU 3 preferably includes two independent address generation units for generating two address signals (each identifying a memory location in memory 6 for writing data to or reading data from) and asserting such address signals to address buses AB0 and AB1. More specifically, in response to control bits from PCU 2 (which have been generated in PCU 2 by decoding instructions from program memory 4), MMU 3 asserts address signals on address bus AB0 and/or address bus AB1. Data is read from the memory location (in memory 6) identified by each address into pipeline register M0 or pipeline register M1 (or data is written from data bus RB0 and/or data bus RB1 into the memory location identified by each address).

Preferably MMU 3 includes a set of eight address pointer registers (each for storing a 16-bit address which can be asserted to bus AB0 or AB1), an 8-bit pointer modifier register for each address pointer register, and a 16-bit adder for adding the contents of any selected address pointer register with the contents of a corresponding pointer modifier register, and writing the result of this addition back into the address pointer register (in response to control bits from PCU 2). Preferably, MMU 3 also includes other registers for use in modifying the contents of selected ones of the address pointer registers and pointer modifier registers in response to control bits from PCU 2.

In the DSP of FIG. 1, each of first data bus DB0 and second data bus DB1 is preferably 16 bits wide. In variations on the FIG. 1 system, a DSP programmed to implement the invention can have a single port data memory (rather than a dual port data memory), and single address bus and a single data bus (rather than dual address buses and dual data buses).

PCU 2 (a preferred implementation of which will be described below with reference to FIG. 3) includes instruction fetch means (for fetching instructions from program memory 4), an instruction decode unit, and registers for storing control bits generated in the decode unit (for assertion to MMU 3, data bus DB0, or the instruction fetch means).

Arithmetic computational unit (ACU) 10 preferably includes two Multiply and Accumulate (MAC) units which operate in parallel (in response to control bits from PCU 2), and an arithmetic manipulation unit (AMU) which operates in parallel with the MAC units (in response to control bits from PCU 2), as shown in FIG. 5 to be discussed below. The inventive bit rotation and shift circuit (a preferred embodiment of which is shown in FIGS. 6 and 7 to be discussed below) is preferably included within the AMU.

IOU 12 includes means for monitoring the addresses on address buses AB0 and AB1 to determine the type of memory access being implemented. IOU 12 sets a flag to PCU 2 if the addresses are outside a predetermined address range (e.g., addresses for an external memory, other than memory 6, accessible through a port connected along bus AB0 and/or AB1). PCU 2 can assert wait states for slower memory accesses in response to such flags.

The present invention is desirably implemented in a DSP for use in communications operations. For example, it is contemplated that in a preferred embodiment, the DSP of FIG. 1 is programmed to implement the invention, and this programmed processor (identified as processor 100 in FIG. 2) is then included in a mobile digital telephone system of the type shown in FIG. 2. In the FIG. 2 system, serial port SIO of DSP 100 receives digitized speech from audio codec unit 106, and DSP 100 sends digital audio data (via port SIO) to codec unit 106 for conversion to analog form and then transmission to a loudspeaker. DSP 100 is also connected through analog front end circuit 104 to an RF transceiver 108. Circuit 104 includes means for digitizing a received signal from transceiver 108 (for baseband processing by means within DSP 100), and for converting digital data from DSP 100 into a continuous analog signal for transmission by transceiver 108. In typical implementations, circuit 104 would interrupt DSP 100 to indicate a request for or a presence of data (and circuit 104 is mapped into a memory address of DSP 100 so that circuit 104 can efficiently communicate over one of the data buses within DSP 100). Microcontroller 102 supplies control signals to all other elements of the FIG. 2 system and controls the communication protocol between the FIG. 2 system (which is typically a mobile station) and a remote base station.

Typically, microcontroller 102 would be connected to a parallel port (PIO) of DSP 100.

Conventional circuits for performing left and right shifting of bits (the bits comprising a data word) have been employed in arithmetic computational units of DSPs. However, such shifting circuits have included two separate circuit branches: one for shifting the bits to the left; the other for shifting the bits to the right. Furthermore, such conventional circuits have not been capable of shifting more than a single bit rotation in one cycle.

SUMMARY OF THE INVENTION

In one embodiment, the invention is a circuit having a single branch which is controllable to implement a selected one of a left shift of bits comprising a data word, and a right shift of bits comprising the data word. In a preferred embodiment, the inventive circuit has a single branch and is controllable to implement any selected one of the following operations: a left shift of bits comprising a data word; a right shift of bits comprising the word; and rotation (to the left or right) of bits comprising the word.

In one preferred implementation, the circuit includes a set of series-connected multiplexer stages, and circuitry for selectively inverting the order of the bits of the word input to and the word output from the set of multiplexer stages. Each of the multiplexer stages shifts the bits of the word it receives either by zero places (in response to a first condition of a control signal), or by a positive number of places (in response to a second condition of the control signal). By selectively controlling various subsets of the multiplexer stages, the bits of the input word can be shifted by any of a number of places (from zero to N, where N is some positive number of places). Preferably (where each multiplexer stage receives a 40-bit word), there are five multiplexer stages, capable of one, two, four, eight, and sixteen place shifts, respectively.

To execute a left shift, the circuitry for selectively inverting the input to the multiplexer stages does not invert the order of the bits of the input word. To execute a right shift, the circuitry for selectively inverting the input to the multiplexer stages does invert the order of the bits of the input word.

To enable the circuit to perform rotations (by a selectable number of bits to the left or right) of bits of the input word, a first one of the multiplexer stages includes bit selection circuitry for asserting appropriate bits needed for executing any such rotation to multiplexing circuitry in that multiplexer stage.

Another embodiment is a circuit for executing a selected one of left rotation or right rotation (by a selected number of places) of bits of a data word, in response to a single control signal. An example of such a single control signal is a set of control bits received (by the circuit) during a single cycle of an instruction pipeline. In one implementation, the inventive circuit routes the control bits (and/or additional control bits that it generates in response to the control bits) to appropriate ones of the circuit's elements during the single cycle, and the circuit completely executes the rotation specified by the control bits during said single cycle.

Another aspect of the invention is a digital signal processor including any of the above-described circuits. Another aspect of the invention is the method implemented by any of the above-described circuits.

DETAILED DESCRIPTION OF THE PREFERRED EMBODIMENTS

Figure 1:
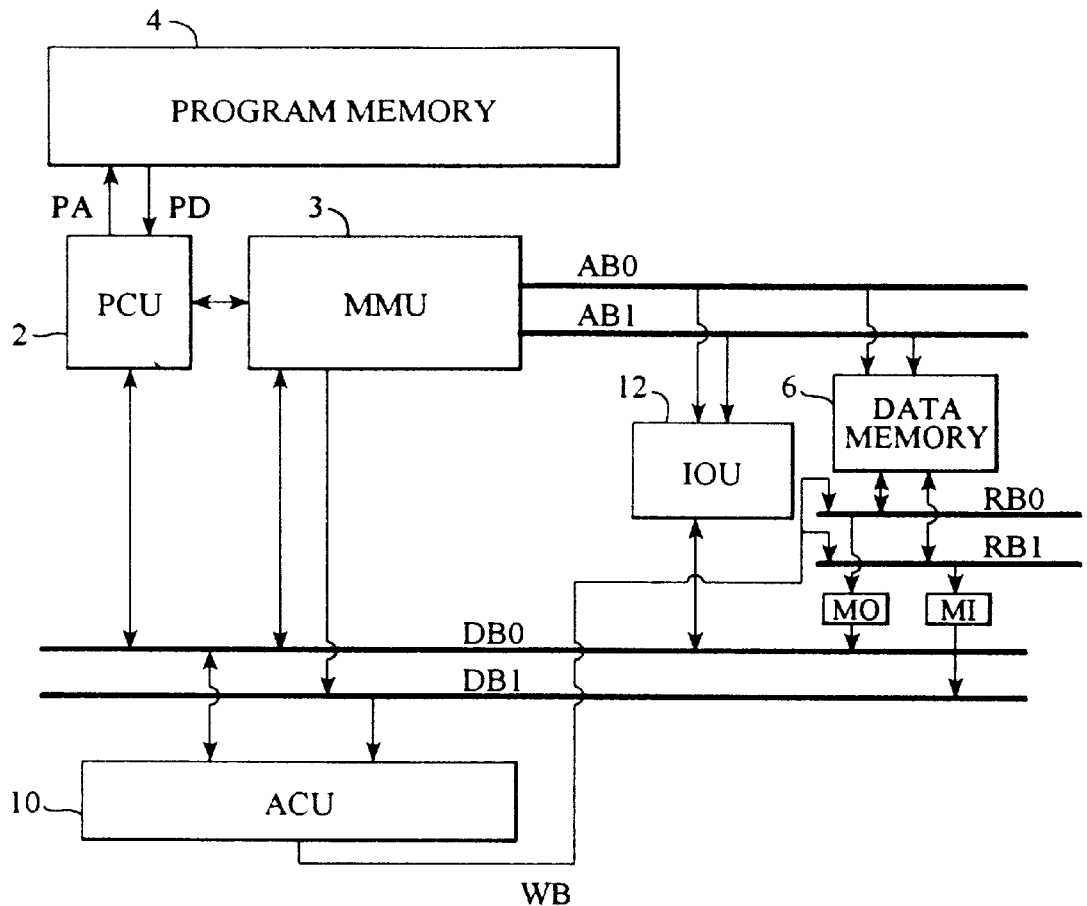
FIG. 1 is a schematic block level diagram of a digital signal processing system (DSP) which includes a program memory, a dual port data memory, general purpose data buses (DB0 and DB1), and a dedicated write bus (WB).
Figure 2:
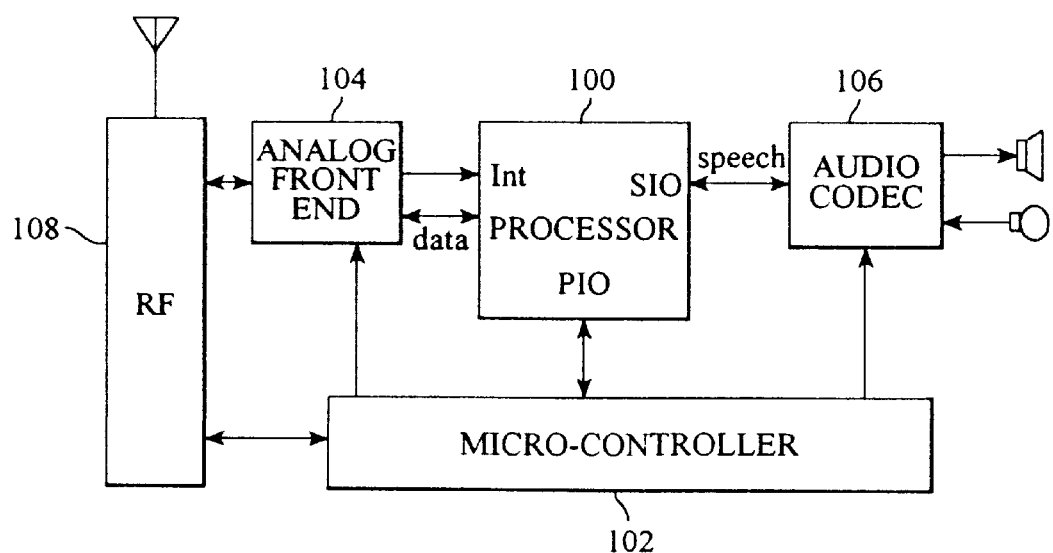
FIG. 2 is a schematic block level diagram of a mobile digital telephone system which includes the DSP of FIG. 1.

In a preferred embodiment, the present invention is implemented in a digital signal processor (DSP) of the type described herein with reference to FIGS. 1, 3, 4, and 5 (which can be included in a system of the type shown in FIG. 2). Additional aspects of such DSP are described in U.S. patent applications "Digital Signal Processing Method and System Employing Separate Program and Data Memories to Store Data" by M. Touriguian, G. Fettweis, and I. Verbauwhede (Atty Docket No. TEKN-5900), "Digital Signal Processing Method and System Implementing Zero Overhead Nested Loops" by K. Gupta, M. Touriguian, I. Verbauwhede, and H. Neff (Atty Docket No. TEKN-6000), and "Digital Signal Processing Method and System Implementing Pipelined Read and Write Operations" by Verbauwhede and G. Fettweis (Atty Docket No. TEKN-6100), all filed on the same day as (and assigned to the assignee of) the present application, the disclosures of which are incorporated herein in full by reference.

Figure 3:
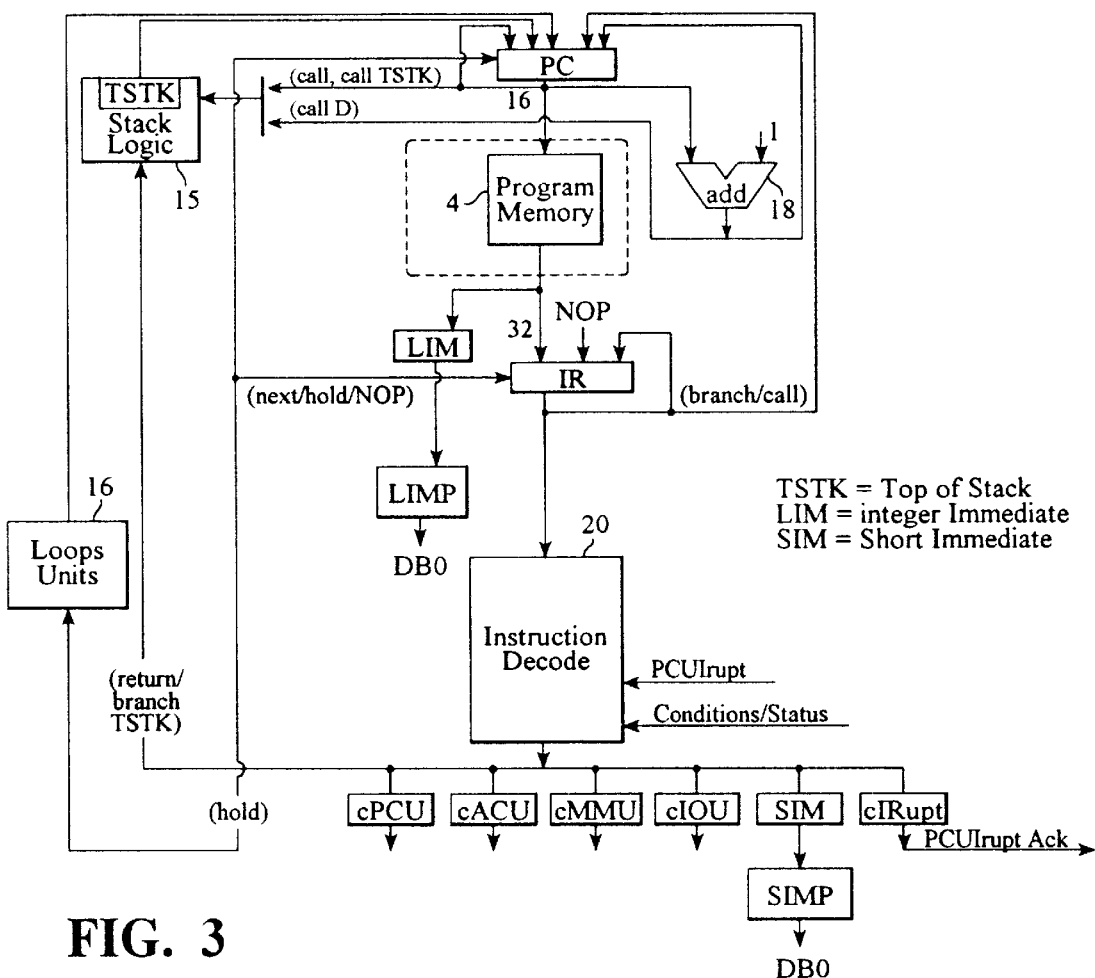
FIG. 3 is a schematic block level diagram of a preferred implementation of the program control unit of the DSP of FIG. 1.

FIG. 3 is a diagram of a preferred implementation of program control unit (PCU) 2 of the DSP. PCU 2 of FIG. 3 receives (at instruction register IR) a sequence of 32-bit instructions from program memory 4, generates control signals for controlling execution of the instructions, and stores the control signals in selected ones of registers cPCU, cACU, cMMU, cIOU, and cIRupt.

Each 32-bit word stored in program memory 4 can be either an instruction, or a data value to be processed in accordance with one or more instructions.

As shown in FIG. 3, PCU 2 includes program counter register PC for storing a sequence of 16-bit instruction addresses (for use in addressing program memory 4), and instruction register IR for receiving a 32-bit word (either a data value or an instruction) read from program memory 4 in response to each instruction address asserted from register PC to memory 4. In executing a program comprising a sequence of instructions, PCU 2 loads a sequence of 16-bit instruction addresses into register PC for addressing program memory 4, and instruction register IR (and/or below-discussed register LIM) receives a sequence of 32-bit words (each of which is either a data value or an instruction) from program memory 4 (memory 4 asserts one 32-bit word to register IR or register LIM in response to each 16-bit instruction address asserted from register PC to memory 4).

PCU 2 also includes instruction decode unit 20 which includes logic circuitry for receiving and processing 32-bit words from instruction register IR. In response to a distinctive instruction (denoted herein as a "program memory data" instruction) received from register IR, unit 20 treats bits from program memory 4 as data values (rather than as instructions) in the sense that unit 20 causes these bits to be written (e.g., for processing in ACU 10) to a register (such as LIM or SIM) and then to one or more pipeline registers (e.g., registers LIMP or SIMP) and then to data bus DB0. In response to each word in register IR other than a data value designated by a program memory data instruction, unit 20 decodes such word to generate therefrom a set of control bits for controlling operation of the system (e.g., control bits which are asserted from unit 20 to register cMMU, and then from register cMMU to MMU 3 for use in controlling a read of data from data memory 6).

PCU 2 of FIG. 3 also includes stack logic 15 (including "top of stack" register TSTK), adder 18, and loop unit 16. A preferred implementation of loop unit 16 is described in the above-referenced U.S. patent application entitled "Digital Signal Processing Method and System Implementing Zero Overhead Nested Loops" (Attorney Docket No. TEKN-6000), filed on the same day as the present application.

Each time register PC asserts an instruction address to program memory 4 (during each "fetch" cycle of the pipelined operation to be described below), adder 18 increments this instruction address (by adding "1" thereto). The incremented address asserted at the output of adder 18 can be asserted directly to register PC or to stack logic 15. In one operating mode, the incremented address is asserted from adder 18 to register PC. In another operating mode, the register PC is updated with the contents of register TSTK (rather than with the output of adder 18).

Stack logic 15 implements a sixteen level deep hardware last-in-first-out (LIFO) stack for execution of program calls and returns for subroutine branching. A stack pointer selects which one of the sixteen registers is accessed. A read from register TSTK (to register PC) pops the stack, and a write to register TSTK pushes a return address into the stack. At appropriate times during execution of a sequence of instructions from memory 4, the incremented address from adder 18 is written to top of stack register TSTK (so that the incremented address is the next address loaded to program counter register PC).

When implementing the five stage instruction pipeline described below with reference to FIG. 4, it takes two cycles to execute a program branch as follows. During a fetch cycle, a branch instruction is fetched from memory 4 and saved in register IR. Then, in the decode cycle, unit 20 decodes the instruction in register IR and the branch address is placed in register PC to cause the program to branch to the new address. If the instruction is a call instruction, in the same cycle, the return address is pushed into a location in the stack pointed to by an incremented value of the stack pointer. Then, when a return from a subroutine occurs, the contents of this location are loaded (i.e., the return address) into register PC and the stack pointer is decremented.

Loop unit 16 includes logic circuitry for executing a group of instructions a pre-specified number of times, in response to control bits generated by unit 20 (which can be stored in register cPCU and then asserted from register cPCU to unit 16). Preferably, initialization of unit 16 is performed independently from operation of unit 16 (to execute looped instructions) so that initialization need not be performed in response to initialization bits which immediately precede the instructions to be looped. Also preferably, unit 16 is designed so it requires neither a special "start of loop" instruction at the beginning of the group of instructions to be looped nor a special "dedicated branch" instruction at the end of such group of instructions.

Figure 5:
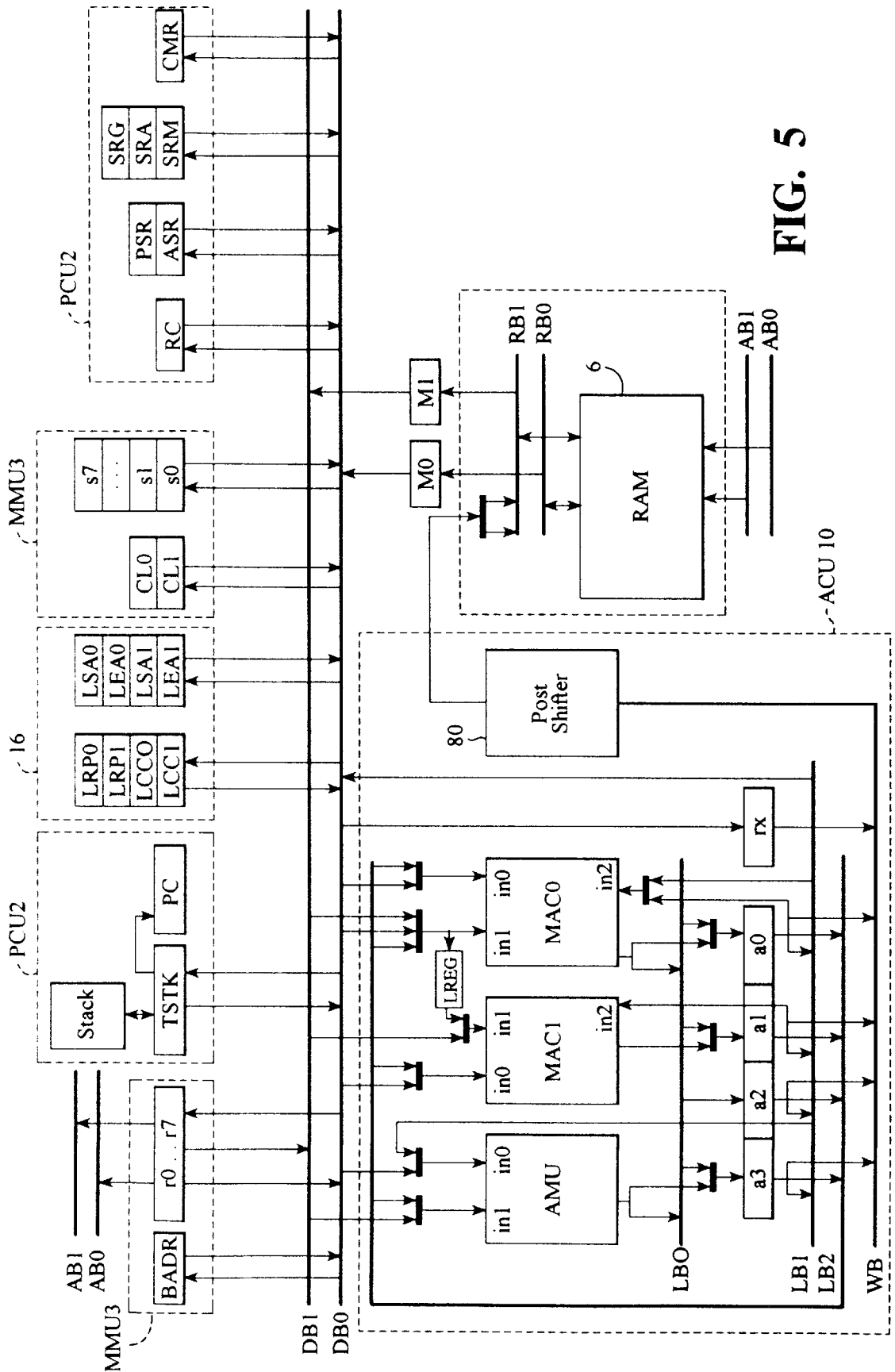
FIG. 5 is a block level diagram of the DSP of FIG. 1, showing registers and buses included therein.

PCU 2 preferably includes additional registers (e.g., repeat counter register RC, post shifter register PSR, arithmetic manipulation unit shift register ASR, status registers SRG, SRA, and SRM, and control/mode register CMR, shown in FIG. 5) for storing control and status bits for assertion to bus DB0 at appropriate times during system operation.

Figure 4:
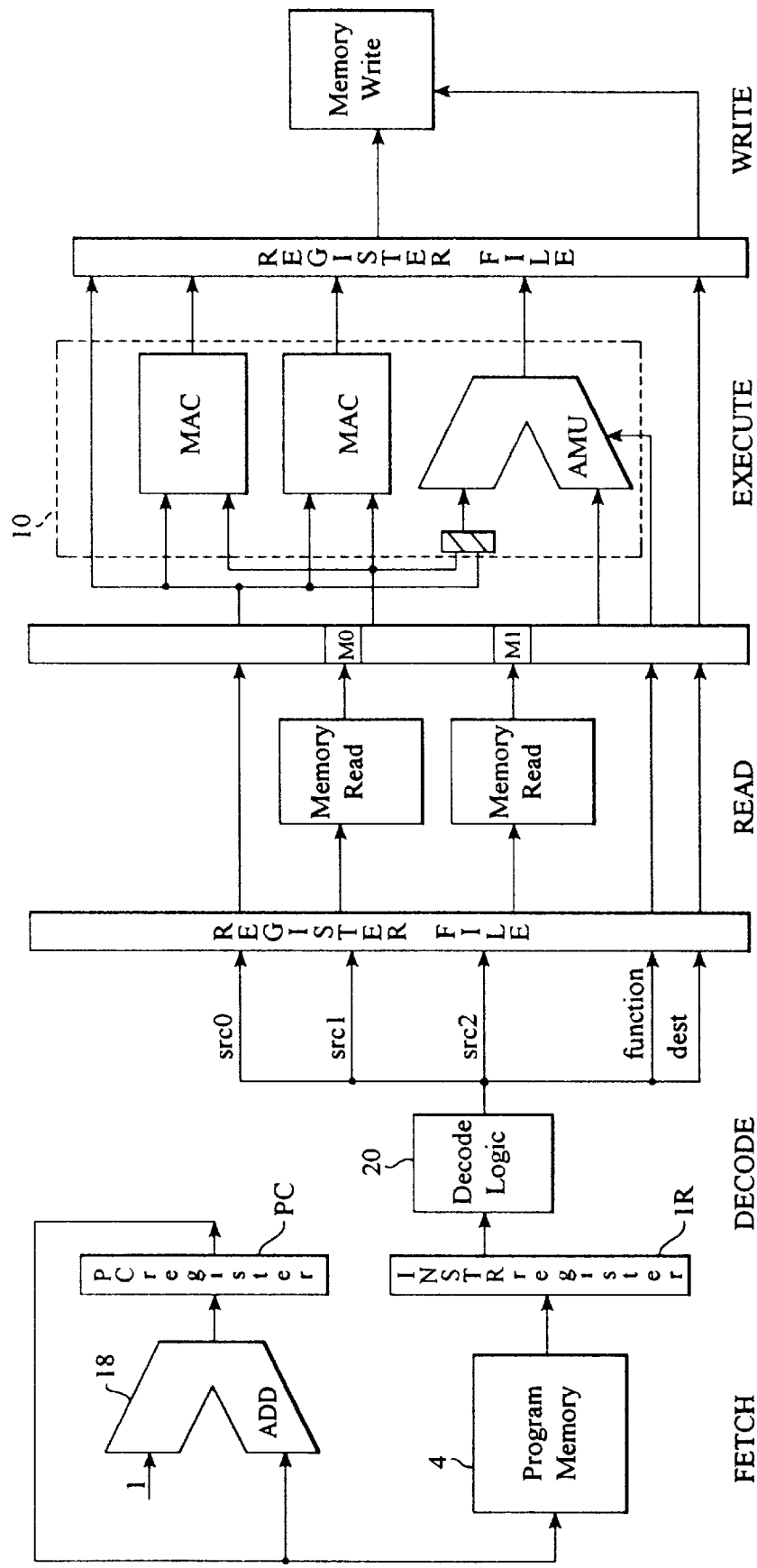
FIG. 4 is a diagram of the pipelined manner in which the DSP of FIGS. 1 and 3 preferably executes a sequence of instructions from program memory 4.

FIG. 4 is a diagram of a five stage instruction pipeline in accordance with which the DSP of FIGS. 1 and 3 (including PCU 2 shown in and described with reference to FIG. 3) preferably executes a sequence of instructions from program memory 4. This pipeline is a "five stage" pipeline in the sense that five clock cycles (referred to as "fetch," "decode," "read," "execute," and "write" cycles) are required to execute one instruction. However, a new instruction can be received from program memory 4 every clock cycle, so that the effective number of clock cycles per instruction (averaged over many clock cycles) is one. The pipeline is implemented with a "register-memory" architecture, in the sense that an access of the data memory (memory 6) is part of an instruction. This is different from a "load-store" architecture, where a memory is accessed only with a move operation (e.g., specific "load" and "store" instructions).

During the first (Fetch) cycle of the pipeline, a word (which is typically an instruction) is fetched from program memory 4. The following description of the pipeline (with reference to FIG. 4) assumes that the word is an instruction. Also during the Fetch cycle, the instruction fetched from memory 4 is put into instruction register IR, and program counter register PC is updated with a new instruction address (which can be an incremented address asserted at the output of adder 18).

Then, during the Decode cycle of the pipeline, instruction decoding unit 20 receives and decodes the instruction in register IR, thereby generating control signals (control bits) for controlling execution of the instructions. Unit 20 stores the control signals in selected ones of instruction control registers cPCU, cACU, cMMU, cIOU, and cIRupt as follows: control bits for ACU 10 are stored in register cACU, control bits for memory management unit 3 (such as control bits src0, src1, and src2) are stored in register cMMU, control bits for PCU 2 are stored in register cPCU, control bits for IOU 12 are stored in register cIOU, and control bits for an interrupt controller (optionally included within IOU 12) are stored in register cIRupt. Also, MMU 3 receives any control bits src0, src1, and/or src2 that are generated by unit 20 during the Decode cycle, MMU 3 decodes at least those of these control bits which determine addresses for reading data from memory 6, and MMU 3 generates address signals needed for performing such read operations (so that MMU 3 is ready to assert these address signals on address bus AB0 and/or address bus AB1 at the start of the next cycle of the pipeline which is the "Read" cycle of the instruction).

Then, during the Read cycle, data is read from one or two locations within data memory 6. The data read from one such location is written to register M0 (shown in FIG. 1), and the data read from the other location is written to register M1 (also shown in FIG. 1). Any post-modification of address signals to be performed by MMU 3 is also performed during the Read cycle (so that the modified address signals can be used during subsequent Read and/or Write cycles). Any data values (in contrast with instructions) fetched from program memory 4 during the preceding "Fetch" are also pipelined (transferred to their appropriate destinations during the Read cycle.

Then, during the "Execute" cycle, computations are performed (typically by ACU 10) on the data values residing in the source registers of each data processing unit (e.g., arithmetic manipulation unit "AMU" or one of multiply/accumulate unit "MAC0" and "MAC1" within ACU 10, as shown in FIG. 5) for performing such computations. For example, ACU 10 receives and processes data values from appropriate registers (e.g., registers LIMP or SIMP within PCU 2, or registers M0 or M1, or registers within ACU 10) during the Execute cycle. Each data processing unit places the resulting processed data values in appropriate registers (e.g., in appropriate ones of accumulator registers a0, a1, a2, and a3 within ACU 10, as shown in FIG. 5).

Then, during the final ("Write") cycle, processed data values are written back to data memory 6. Optionally also, some post-processing such as post-shifting, is performed on the processed data values (e.g., by post shift 80 within ACU 10, as shown in FIG. 5) before they are written into memory 6.

Additional details of a preferred implementation of the "Read" and "Write" cycles of the FIG. 4 pipeline will be discussed below with reference to FIG. 5.

The control bits asserted to MMU 3 in the Decode cycle include bits which determine addresses, which in turn determine memory locations from which data are to be read (during the Read cycle) and to which processed data are to be written (during the Write cycle).

For example, PCU 2 can assert control bits src0, src1, and/or src2 to MMU 3 during the Decode cycle, where some of these control bits determine addresses of two data values to be read from two locations of memory 6 (during the Read cycle of the instruction), and the remaining ones of the control bits determine the address of a location of memory 6 to which a processed data value (to be generated during the Execute cycle which follows the Read cycle) is to be written (during the Write cycle which follows the Execute cycle). MMU 3 can be controlled in any of several ways to generate address signals that determine these three addresses. For example, field src0 can determine an 8-bit offset to be concatenated with an 8-bit "base" address (prestored in register BADR, shown in FIG. 5, within MMU 3) to generate a 16-bit address (for one of the data values to be read from memory), and the 16-bit address then loaded into one of registers r0–r7. For another example, field src1 can determine both a destination (one of registers r0–r7) and a source (e.g., a register external to MMU 3 and connected along bus DB0, or one of circular address registers CL0 or CL1 within MMU 3 when MMU 3 operates in a circular addressing mode, or one of registers s0–s7 within MMU 3 when MMU 3 operates in a post-modification mode in which a prestored address in the destination is to be modified by a value in one of registers s0–s7). The address in the source is then loaded to the destination, either during the Decode cycle (where the address in the destination is for a read operation) or during the Read cycle (where the address in the destination is for a write operation). An example of the latter operation (performed in the Read cycle) is post-modification of a prestored address in one of registers r0–r7 by overwriting at least a portion thereof with a value in one of registers s0–s7.

MMU 3 pipelines the addresses for read and write operations (for executing a single instruction), in the following sense. MMU 3 asserts addresses (for use in reading data from memory 6) on address bus AB0 and/or address bus AB1 at the start of the instruction's Read cycle. However, MMU 3 delays assertion of an address (for use in writing processed data to memory 6) on address bus AB0 or address bus AB1 until the start of the instruction's Write cycle, even though MMU 3 may have generated this address during a previous pipeline cycle (in response to control bits received from PCU 2 during the instruction's Decode cycle).

Preferably, the DSP includes a dedicated bus (e.g., special-purpose write bus WB shown in FIG. 5) for writing processed data bits from a data processing unit (e.g., ACU 10 as shown in FIG. 5) to a data memory (e.g., memory 6 as shown in FIG. 5), during the Write cycle of an instruction pipeline). More specifically, as shown in FIG. 5, ACU 10 preferably includes accumulator registers a0, a1, a2, and a3 for storing processed data values output from units AMU, MAC0, and/or MAC1 during an Execute cycle. Each of registers a0, a1, a2, and a3 is preferably a 40-bit register for storing a word consisting of eight guard bits, a 16-bit "high word" portion, and a 16-bit "low word" portion. Also within ACU 10, three local buses (LB0, LB1, LB2) interconnect the output and input of each of ACU 10's processor units AMU, MAC0, and MAC1 with accumulator registers a0, a1, a2, and a3.

A first portion of dedicated write back bus WB connects accumulator registers a0, a1, a2, and a3 with the input of post shift unit 80, and a second portion of bus WB connects the output of post shift unit 80 to RAM bus 0 (RB0) and/or to RAM bus 1 (RB1). The function of post shift unit 80 is to shift (to the right or to the left) the bits of each 40-bit data value transferred from one of the accumulator registers over bus WB (during the Write cycle of an instruction), and to select a subset of the shifted bits for assertion to bus RB0 or bus RB1. By connecting post shift unit 80 closer to accumulator registers a0, a1, a2, and a3 than to buses RB0 and RB1, a relatively long portion of write bus WB (the portion between unit 80 and buses RB0 and RB1) can have smaller width (e.g., 16-bits) than the other portion of write bus WB (the portion between registers a0–a3 and unit 80).

At the start of each Write cycle, post shift unit 80 receives a 40-bit data value from any of accumulator registers a0, a1, a2, and a3, and shifts the bits thereof (preferably by any number of places from zero through eight to the right or by any number of places from zero through sixteen to the left). Either the 16 higher-order bits (other than guard bits) of the value (typically a shifted value, or a zero shifted value) output from unit 80, or the 16 lowest-order bits of the value (typically a shifted value, or a zero shifted value) output from unit 80, are transferred over a second part of the bus WB from unit 80 to a selected one of bus RB0 and bus RB1. Each 16-bit data value placed on bus RB0 (from unit 80) is written (through one port of data memory 6) to a memory location in memory 6 determined by an address that has been asserted to address bus AB0 from MMU 3 (during the same Write cycle), and each 16-bit data value placed on bus RB1 (from unit 80) is written (through the other port of data memory 6) to a memory location in memory 6 determined by an address that is asserted to address bus AB1 from MMU 3 (during the same Write cycle). Thus, in effect, any 16-bit portion of a data value in one of registers a0, a1, a2, and a3 can be written during the Write cycle to memory 6. When no shift (i.e., a zero shift) is implemented by unit 80, unit 80 preferably operates in a default mode in which it asserts to bus RB0 (or RB1) the 16-bit "higher-order word" portion of the 40-bit value asserted from one of registers a0, a1, a2, and a3 to the input of unit 80. In addition, zero shift could be specified with the low word asserted.

Control bits determining the amount of each shift to be performed by unit 80 are written by PCU 2 to "post shift" register PSR (shown in FIG. 5) in response to an instruction from program memory 4. The PSR is not, however, loaded during the same post shift instruction. The PSR can be loaded in a separate move instruction in the PCU 2 and then later used in a post-shifting instruction or a post-shift value is specified in the same post-shifting instruction. In the latter case, PSR is not affected and its contents are not altered with that post shift value. In addition, unit 80 operates in response to control bits in control/mode register CMR, which has a control bit of PSRdis (or PSR disable), which determines whether or not the post-shifting operation uses the PSR register.

Preferably, the DSP is programmed to execute instructions in a pipelined manner (in which addresses for reads from a memory are asserted on an address bus in one pipeline cycle and addresses for writes to the memory are asserted on the same address bus in a different pipeline cycle), and in a manner avoiding expected address bus and data bus conflicts or collisions.

Figure 6:
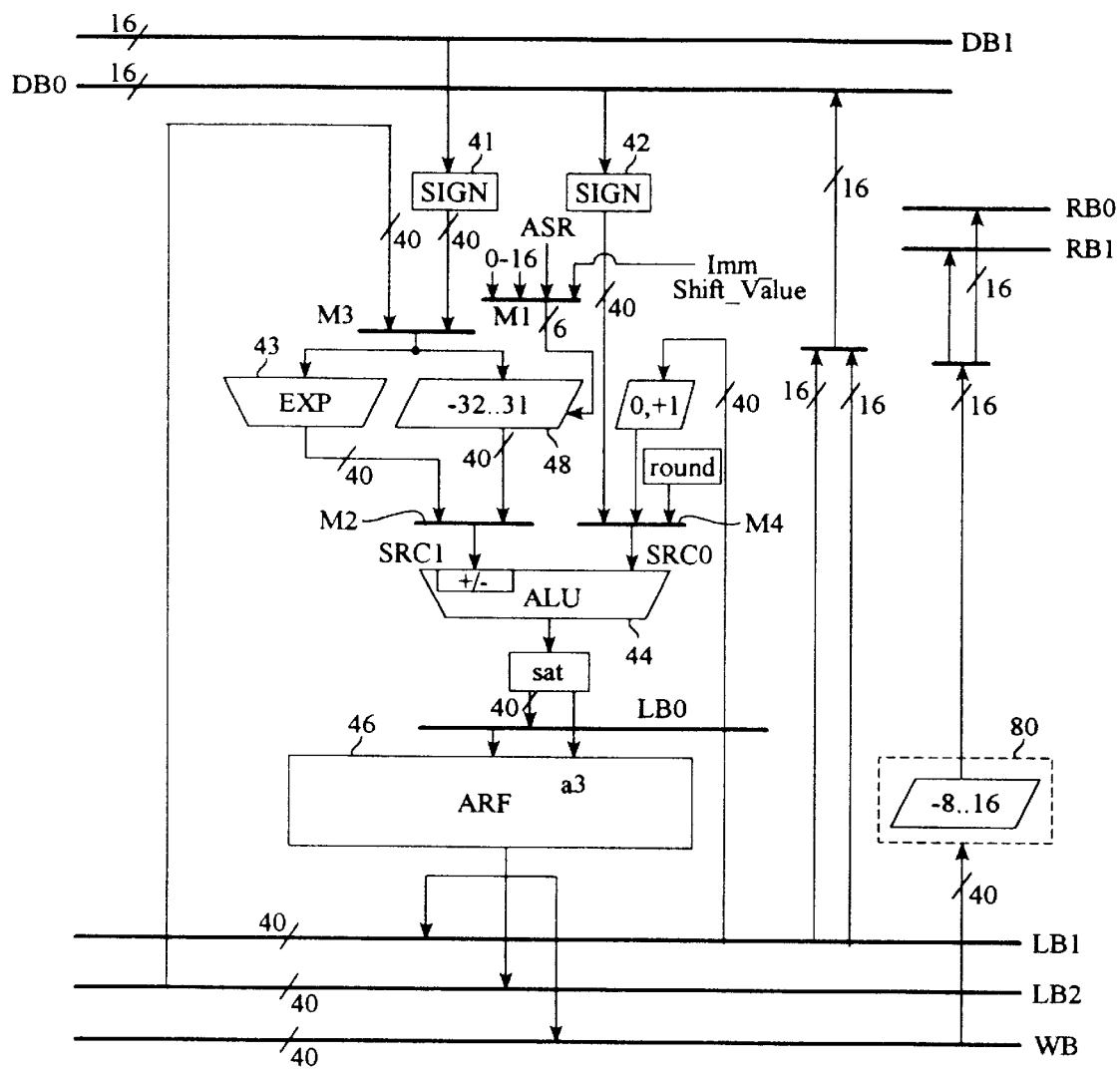
FIG. 6 is a block level diagram of an embodiment of the arithmetic manipulation unit (AMU) of the DSP of FIG. 5. The AMU of FIG. 6 includes input shifter circuit 48 which embodies the invention.

Next, with reference to FIG. 6, we describe a preferred implementation of arithmetic manipulation unit (AMU) of FIG. 5. The AMU of FIG. 6 includes input shifter circuit 48, which is a barrel shifter which embodies the invention.

The AMU of FIG. 6 includes sign extension unit 41 (which receives 16-bit data words from bus DB1), sign extension unit 42 (which receives 16-bit data words from bus DB0), multiplexer M3, exponent extraction unit 43, input shifter circuit 48, multiplexer M2, multiplexer M4, arithmetic logic unit 44 (for performing simple logic and arithmetic operations), and accumulator register file 46 (which includes above-discussed registers a0, a1, a2, and a3, shown in FIG. 5).

The AMU of FIG. 6 receives data either from data bus DB0 or DB1, or from its internal feedback paths (which include internal bus LB1 and internal bus LB2). Each 16-bit word from bus DB0 is processed in sign extension unit 42 (to generate therefrom an extended 40-bit word) in one of several ways (each in response to control bits from PCU 2): unit 42 adds an 8-bit sign/zero extension (e.g., eight identical zero bits, or eight identical sign bits) as the eight most significant bits of the extended word; and unit 42 also adds a 16-bit bit extension (which can consist of sixteen identical default bits such as "0" bits, or can consist of a 16-bit word from bus DB1) as the sixteen least significant bits of the extended word.

Similarly, each 16-bit word from bus DB1 is processed in sign extension unit 41 (to generate therefrom an extended 40-bit word) in one of several ways (each in response to control bits from PCU 2): unit 41 adds an 8-bit sign/zero extension (e.g., eight identical zero bits, or eight identical sign bits) as the eight most significant bits of the extended word; and unit 41 also adds a 16-bit bit extension (which can consist of sixteen identical "0" bits, or can consist of a duplicate of the original 16-bit word from bus DB1) as the sixteen least significant bits of the extended word. Circuits 41 and 42 operate in response to control bits supplied thereto from PCU 2.

Multiplexer M3 selects either the 40-bit extended word from unit 41 or the 40-bit processed word from bus LB2 (in response to control bits from PCU 2). Multiplexer M4 can select the 40-bit extended word from unit 42, or the 40-bit processed word from bus LB1 (or a version of the latter 40-bit word which has been shifted by one bit), in response to control bits from PCU 2.

The notation "bits [39;0]" (or "word [39;0] or "bit [39] through bit [0]") will sometimes be used to denote any of the 40-bit words processed by the FIG. 6 circuit (e.g., any of the 40-bit word outputs from circuit M3 and received at the input of circuit 48), where bit [39] is the most significant bit, and bit [0] is the least significant bit. The eight most significant bits [39;32] of one such data word are sometimes denoted herein as "guard bits." Bits [31;16] are sometimes denoted herein as the "high word" (or "higher-order word") portion of word [39;0], and bits [15;0] are sometimes denoted herein as the "low word" (or "lower-order word") portion of word [39;0].

Exponent extraction unit 43 searches for redundant sign bits in each 40-bit word it receives from circuit M3, and outputs a data value indicative of the required shift value (from −8 to +31) to move the sign bit (of the input word received by unit 43) to bit [31].

ALU 44 preferably includes a number of processing cells, each for performing a different logic operation (e.g., an "AND" or "OR" operation) or arithmetic operation on a pair of 40-bit words that it receives from multiplexers M2 and M4. The processing elements are independently selectable.

The output of ALU 44 is supplied (preferably through a saturation detector as shown in FIG. 6, which saturates the output of ALU 44 upon detecting an overflow condition indicated by at least one of guard bits [39;32] and bit [31] differing from another of guard bits [39;32] and bit [31]) to one or more of registers a0, a1, a2, and a3 within accumulator register file 46, and if the saturation condition bit within the CMR is turned on. As described above, a data value stored in a register within register file 46 can be transferred over write bus WB to post shift unit 80, and from post shift unit 80 over a second part of the bus WB to bus RB0 or RB1 (and then to memory 6).

Alternatively, a data value stored in a register within register file 46 can be transferred over bus LB1 back to one of the circuits providing inputs to circuit M4 (or to bus DB0), or over bus LB2 back to circuit M3.

Figure 7:
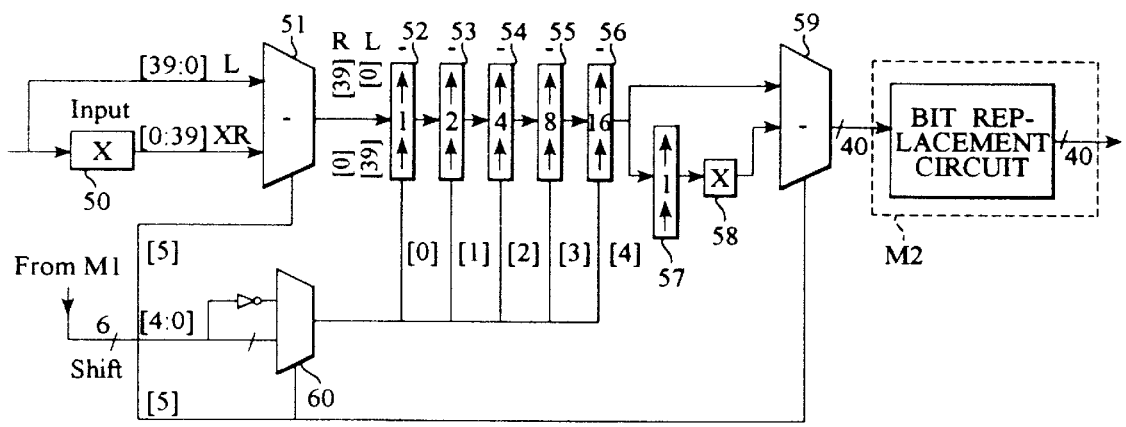
FIG. 7 is a block level diagram of a preferred implementation of a portion of the circuit shown in FIG. 6, which embodies the invention.

We next describe operation of circuit 48 of FIG. 6 (a preferred implementation of which is shown in FIG. 7). Circuit 48 can be controlled (e.g., by the SHIFT signal) to implement an arithmetic shift operation (to the left or right), a logical shift operation (to the left or right), or a rotate operation (to the left or right) on each 40-bit word that it receives from multiplexer M3. Each such 40-bit input word can be an extended word output from unit 41, or a 40-bit word from bus LB2.

It should be noted that the present invention uses a single branch of a typical barrel shifter instead of the prior art techniques of using two branches to accomplish shifting operation. In the prior art, one branch is dedicated to performing the left shift while the other branch is dedicated to performing the right shift. After shifting through the two branches the data is supplied to a multiplexer to select between the output of the left branch or the output of the right branch, using typically the most significant bit of a SHIFT signal.

To make use of the same branch for both positive and negative (left and right) shifts, the following must be done:
1. The input data bit order is inverted when a right shift is required. That way a shift to the left on the inverse bits will look like a shift to the right on the original bits.

2. To use the same SHIFT signal which is represented in 2's complement for both left and right shifts, it must be converted to a positive value. Hence to get the negative of a number, it is inverted and a 1 is added. Thus, for example, +7 is represented as 0111, in 4-bit representation. To get −7, 0111 is inverted, yielding 1000, and then 1 is added, resulting in 1001 for −7 in 2's complement notation.

As seen from the foregoing a positive number has a "0" as the most significant bit, and a negative number has a "1" in the most significant bit position. Therefore, in circuit 60, bit [5] differentiates a left shift (0) from a right shift (1). Thus, when bit [5] is "1", the four bits [0:4] are inverted. That still remains the addition of "1" to get a complete corresponding positive value. This is the function of circuit 57. In addition, circuit 58 reverses the order of the bits to their original order. Therefore, bit [5] is used for three purposes: to select initially in circuit 51 between the incoming data and its inverse order, to select in circuit 60 between the SHIFT signal and its inverse, and to select in circuit 59 between the output of the barrel shifter (52, 53, 54, 55, and 56) and performing the extra shift and inverting the order of the bits back. It should be clear that in the case of circuits 50 and 58, the inversion of the order of the bits is an inversion of the collective order, i.e. bits 0:39 becomes 39:0. In contrast, in circuit 60 the inversion of the bits is the inversion of the logical state of each bit, i.e. a bit having the value "1" becomes "0" and vice versa.

The various possible operating modes of circuit 48 will next be described separately.

When circuit 48 is controlled to implement a rotate operation on an extended 40-bit word from unit 41 (input word [39;0]), the high word portion ([31;16]) of the input word is a 16-bit data value received over bus DB1, the low word portion ([15;0]) of the input word is a duplicate of the high word portion (as a result of unit 41's processing of the 16-bit data value received from bus DB1), and the other bits of the input word are zeros. Circuit 48 implements rotation of the 16-bit data value from bus DB1 by any number of bits up to fifteen to the right or left (i.e., by any number of bits from −15 to +15) by a simple shift operation followed by selection of a 16-bit subset (e.g., by means within circuit M2 to be described with reference to FIG. 7). For rotation to the right by N bits (where N is an integer not greater than 15), circuit 48 simply shifts the bits of the input word by N bits to the right, so that the low word portion ([15;0]) of the shifted word fully determines the rotated 16-bit data value. For rotation to the left by N bits (where N is an integer not greater than 15), circuit 48 simply shifts the bits of the input word by N bits to the left, so that the high word portion ([31;16]) of the shifted word fully determines the rotated 16-bit data value.

When circuit 48 is controlled to implement a rotate operation on a 40-bit word from bus LB2 (input word [39;0]), bits [31;16] do not necessary duplicate bits [15;0], and circuit 48 can only rotate the non-guard bit portion of the word (i.e., bits [31;0]) by one bit to the left or right. Circuit 48 implements such a "rotate to the right by one bit" operation by shifting the bits of the input word by 1 bit to the right, and replacing shifted bit [31] by original (unshifted) bit [0], so that the resulting bits [31;0]) fully determine the rotated 32-bit data value. Circuit 48 implements the corresponding "rotate to the left by one bit" operation by shifting the bits of the input word by 1 bit to the left, and replacing shifted bit [0] by original (unshifted) bit [31], so that the resulting bits [31;0]) fully determine the rotated 32-bit data value.

As previously stated, in the prior art, rotation is accomplished only one bit at a time. Thus, with the DSP of the prior art, a 15 bit rotation would require 15 cycles. In contrast, with the present invention, there are two modes for performing rotation. In the first mode, data is received from LB2 (which is 40 bits wide) and rotation is performed one bit per cycle, just like in the prior art. However, in the second mode of operation, data is supplied from DB1 (which is 16 bits wide), and a rotation by a selected number of bits per cycle (up to 15 bits per cycle) on the data supplied from DB1 is possible. This is done by duplicating the data from DB1, thereby supplying the same data in both the lower order 16 bits and the higher order 16 bits. To perform a left rotate, a left shift is done with the result read from the high order word. To perform a right rotate, a right shift is done with the result read from the low order word.

For example, assume that the data supplied from DB1 is 9635 (in Hexadecimal). When the data is duplicated, it becomes 0096359635 (ignoring the guard bits). A shift of 12 bits to the left would result in 6359635000. The result read from the high order bits would be 5963, which is the result of rotating the original data 9635 by 12 bits to the left.

Similarly, for a shift of 12 bits to the right would result in 0000096359. The result from the low order word is 6359, which is 9635 rotated by 12 bits to the right.

The output result is then constructed in M2 by selecting the result from either the high order word, or the low order word, depending upon whether it is shifted to the left or to the right, and placing it in the high order word with "0" in the guard bits and "0" elsewhere in the word. Thus, the output of M2 in the above case of 9635 shifted by 12 bits to the left is 0059630000. Similarly for the second case above, of 9635 shifted by 12 bits to the right is 0063590000. M2 performs the manipulation in addition to selecting the output 48 and 43.

Circuit 48 is controlled to implement an arithmetic shift operation on an extended 40-bit word from unit 41 ([39;0]) only after unit 41 has processed a 16-bit data value from DB1 to add a sign/zero extension to guard bit positions [39;32] of the extended word (sign extension unit 41 is operated in a "sign extension on" mode to insert such a sign/zero extension as bits [39;32]), and to insert zeros into the low word portion ([15;0]) of the extended word. Circuit 48 is controlled to implement a logical shift operation on an extended 40-bit word from unit 41 ([39;0]) only after unit 41 has processed a 16-bit data value from DB1 to add zeros to guard bit positions [39;32] of the extended word (sign extension unit 41 is operated in a "sign extension off" mode to insert such a "zero" extension as bits [39;32]), and to insert zeros into the low word portion ([15;0]) of the extended word.

When circuit 48 is controlled to implement either a logical shift operation or an arithmetic shift operation, the shift value can be from −16 to 31 (i.e., circuit 48 can shift the bits by up to 16 bits to the right or up to 31 bits to the left). As the extended word is shifted to the left, zeros are shifted into the "right side" (the least significant bits) of the word. As the extended word is shifted to the right (during a logical shift operation), zeros are shifted into the "left side" (the most significant bits, not including the guard bits) of the word. As the extended word is shifted to the right (during an arithmetic shift operation), the sign bit originally in bit position 39 is duplicated and shifted into the "left side" (the most significant bits) of the word.

FIG. 7 is a block level diagram of a preferred implementation of circuit 48 of FIG. 6 which embodies the invention. In the FIG. 7 implementation, circuit 48 is a barrel shifter that can be controlled to perform logical, arithmetic, or rotate shifts in both the left and right directions (i.e., in the direction of the most significant bit or in the direction of the least significant bit). The FIG. 7 circuit operates in response to a six-bit control word (denoted as "SHIFT" in FIG. 7) received from the output terminal of multiplexer M1 (shown in both FIGS. 6 and 7). Multiplexer M1 determines the SHIFT signal by selecting a shift value from one of a number of sources to be the SHIFT signal. In one operating mode, circuit M1 determines the SHIFT signal to be a selected one of the value "0," the value "−16," and a shift value in register ASR (which PCU 2 has written to register ASR, shown in FIG. 5, as a result of decoding an instruction asserted to PCU 2 from program memory 4), where the control bits asserted to multiplexer M1 for selecting one of these three values are asserted to the FIG. 6 circuit from PCU 2 as a result of PCU 2's decoding of an instruction asserted to PCU 2 from program memory 4). In another operating mode, circuit M1 determines the SHIFT signal to be a data value (denoted in FIG. 6 as an "Immediate Shift Value") received by the FIG. 6 circuit from PCU 2 after being received by PCU 2 from program memory 4.

The FIG. 7 circuit includes bit order inversion circuit 50, multiplexer circuit 51, five multiplexer circuits (52, 53, 54, 55, and 56) connected in series, and multiplexer circuit 59 for receiving the output of multiplexer 56 and the output of circuit 58. The output of multiplexer 56 is also supplied through one-bit shifter 57 and bit order inversion circuit 58 to circuit 59. The output of circuit 59 is then processed in bit replacement means within circuit M2, in a manner to be explained below.

Circuit 50 generates an "inverted" input word [0;39] from input word [39;0], by reversing the order of the input word bits in the following sense: the least significant bit [0] of the input word is the most significant bit of the inverted input word, the next-to-least significant bit [1] of the input word is the second most significant bit of the inverted input word, and so on. Multiplexer circuit 51 asserts either the input word ([39;0]) or the inverted input word ([0;39]) in response to a control signal (the fifth bit of the SHIFT signal, denoted as "[5]" in FIG. 7, which differentiates a left shift from a right shift).

Circuit 57 shifts by one place each bit of the 40-bit word output from multiplexer 56 (in the sense that circuit 57 shifts the bit it receives in position [X] to position [X+1] in the output word generated by circuit 57). The shifted 40-bit word output from circuit 57 is then "inverted" by circuit 58, in the following sense. Circuit 58 generates an "inverted" word [0;39] from the shifted input word [39;0] it receives, by reversing the order of the input word bits in the following sense: the least significant bit [0] of the input word is the most significant bit of the inverted word, the next-to-least significant bit [1] of the input word is the second most significant bit of the inverted word, and so on. Multiplexer circuit 59 asserts either the output of circuit 56 or the output of circuit 58 in response to a control signal (the fifth bit of the SHIFT signal, denoted as "[5]" in FIG. 7).

Circuit 60 generates control signals for controlling each of multiplexer circuits 52, 53, 54, 55, and 56, in response to a portion of the SHIFT signal (the five bits of SHIFT which are denoted as "[4;0]" in FIG. 7).

Figure 8:
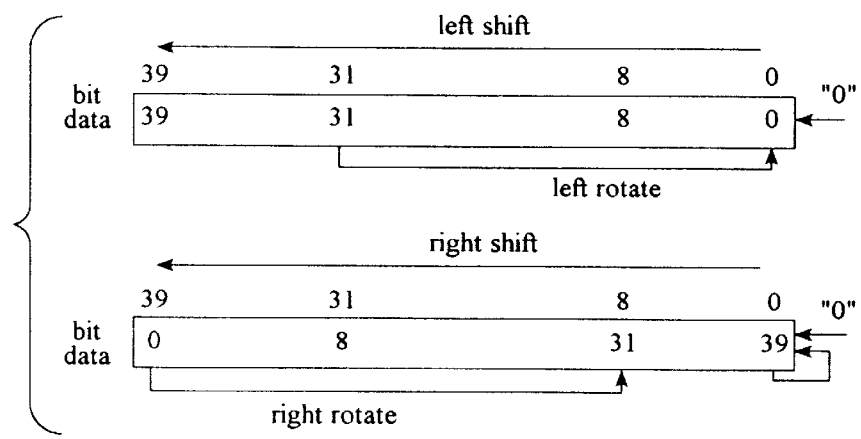
FIG. 8 is a diagram of four operations (left shift, left rotate, right shift, and right rotate) which the FIG. 7 circuit is capable of performing on a 40-bit data word.

FIG. 8 is a diagram of four operations (left shift, left rotate, right shift, and right rotate) which the FIG. 7 circuit is capable of performing on a 40-bit data word [39;0]. As indicated in FIG. 8, the FIG. 7 circuit performs a left shift on the non-inverted data word (circuit 51 selects the input data word that has not been inverted in circuit 50) by shifting the bits thereof to the left, and loading zero bits into the right side of the word (as described above). As indicated in FIG. 8, the FIG. 7 circuit performs a left rotation on the non-inverted data word (circuit 51 selects the input data word that has not been inverted in circuit 50) by shifting the bits thereof to the left, and loading the bit in position [31] into position [0] of the shifted word (as described above). As indicated in FIG. 8, the FIG. 7 circuit performs a right shift by controlling circuit 51 to select the inverted version of the input data word (which has been output from circuit 50) and shifting the bits thereof to the left, and loading zero bits or the sign bit into the right side of the inverted word. As indicated in FIG. 8, the FIG. 7 circuit performs a right rotation by controlling circuit 51 to select the inverted version of the input data word (which has been output from circuit 50), shifting the bits thereof to the left, and loading the bit in position [39] (i.e., bit [0] of the non-inverted input word) into position [8] of the shifted word (i.e., bit [31] of the non-inverted input word).

Figure 9:
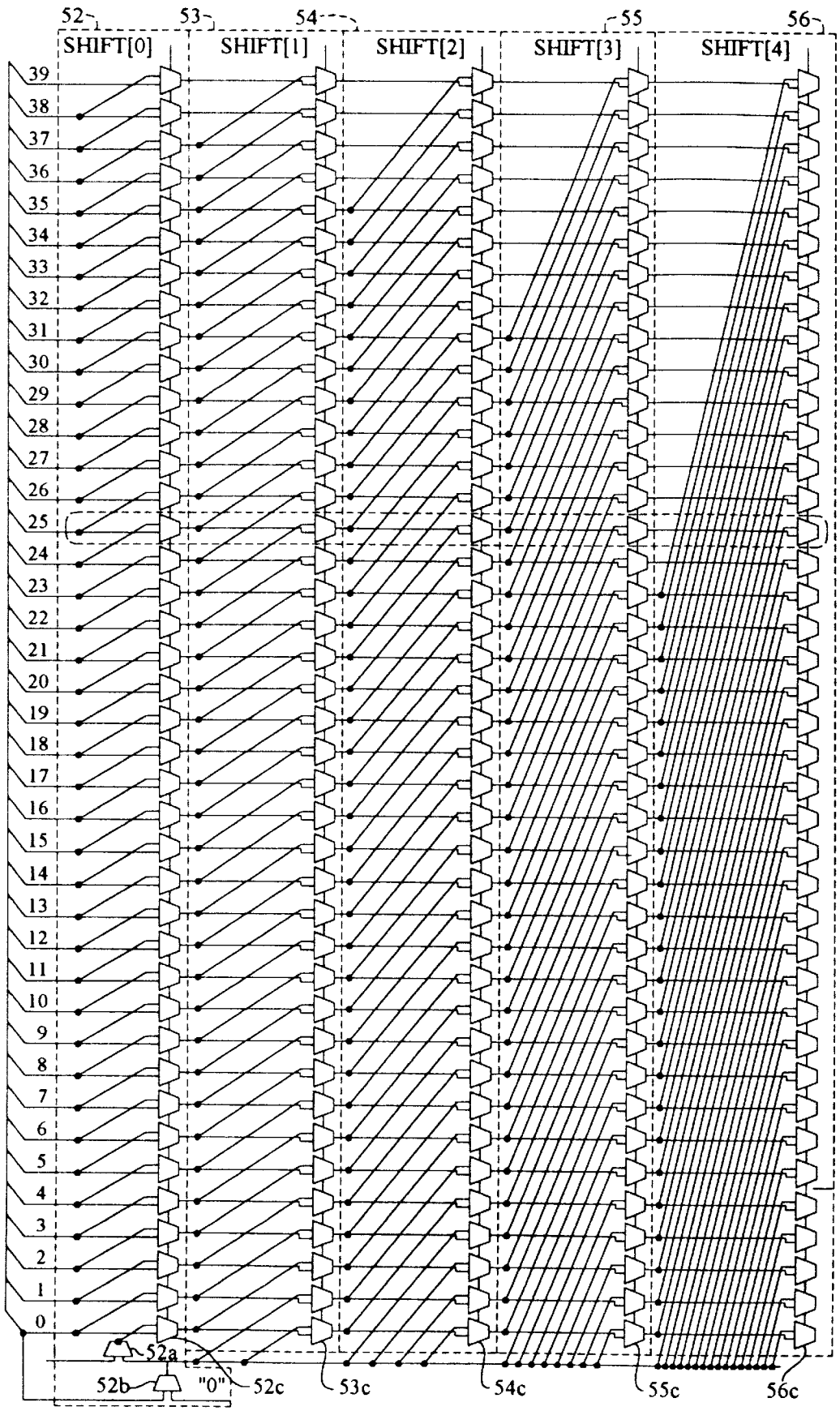
FIG. 9 is a block level diagram of a preferred implementation of a portion of the FIG. 7 circuit.

A preferred embodiment of multiplexer circuits (stages) 52, 53, 54, 55, and 56 is shown in FIG. 9. The design of the FIG. 9 circuitry enables the FIG. 7 circuit to perform either left or right shifts using a single circuit branch (the branch including the series-connected stages shown in FIG. 9) by switching the input data in the described manner (including by inverting the input data in circuit 50 of FIG. 7).

Multiplexer stage 52 comprises forty identical multiplexers connected as shown, each having two inputs (receiving different bits) and one output (for asserting a selected one of the two inputs). Each of these multiplexers selects one of its two inputs in response to a control signal (labeled "[0]" in FIG. 7) from circuit 60. Each of the forty bits of the input word [39;0] (or inverted input word [0;39]) input to multiplexer 52 is either shifted by one place (e.g, the bit in position [27] is shifted to position [28]) or is not shifted, depending on the value of the control signal received by multiplexer 52 from circuit 60.

Multiplexer stage 52 also includes multiplexer 52B, which selectively asserts either the bit in position [0] of the input word, or a "zero" bit (a bit having the value "zero"), in response to a control signal received from PCU 2 (PCU 2 generates this control signal by decoding an instruction word which indicates whether a zero or a sign bit is to be shifted in). Multiplexer 52 also includes multiplexer 52A, which selectively asserts either the bit in position [31] of the input word, or the output of multiplexer 52B, in response to a control signal received from circuit 60. Multiplexer 52C (the lowest, in FIG. 9, of the forty identical multiplexers of circuit 52) receives the output of multiplexer 52A at one input, and receives input bit [0] at another input, and asserts a selected one of these two inputs. Multiplexer 53C (the lowest, in FIG. 9, of the forty identical multiplexers of circuit 53) receives the output of multiplexer 52B at one input, and receives the output of multiplexer 52C at another input, and asserts a selected one of these two inputs. Similarly, multiplexer 54C (of circuit 54) receives the output of multiplexer 52B at one input, and receives the output of multiplexer 53C at another input, and asserts a selected one of these two inputs. Similarly, multiplexer 55C (of circuit 55) receives the output of multiplexer 52B at one input, and receives the output of multiplexer 54C at another input, and asserts a selected one of these two inputs. Similarly, multiplexer 56C (of circuit 56) receives the output of multiplexer 52B at one input, and receives the output of multiplexer 55C at another input, and asserts a selected one of these two inputs.

Multiplexer stage 53 comprises forty identical multiplexers connected as shown, each having two inputs (receiving different bits) and one output (for asserting a selected one of the two inputs). Each of these multiplexers selects one of its two inputs in response to a control signal (labeled "[1]" in FIG. 7) from circuit 60. Multiplexer stage 53 receives the forty bits of the output word from multiplexer stage 52, and either shifts the bits of this word by two places (e.g, the bit in position [27] is shifted to position [29]), or does not shift these bits, depending on the value of the control signal received by multiplexer stage 53 from circuit 60.

Multiplexer stage 54 comprises forty identical multiplexers connected as shown, each having two inputs (receiving different bits) and one output (for asserting a selected one of the two inputs). Each of these multiplexers selects one of its two inputs in response to a control signal (labeled "[2]" in FIG. 7) from circuit 60. Multiplexer 54 receives the forty bits of the output word from multiplexer stage 53, and either shifts the bits of this word by four places (e.g, the bit in position [23] is shifted to position [27]), or does not shift these bits, depending on the value of the control signal received by multiplexer 54 from circuit 60.

Multiplexer stage 55 comprises forty identical multiplexers connected as shown, each having two inputs (receiving different bits) and one output (for asserting a selected one of the two inputs). Each of these multiplexers selects one of its two inputs in response to a control signal (labeled "[3]" in FIG. 7) from circuit 60. Multiplexer 55 receives the forty bits of the output word from multiplexer 54, and either shifts the bits of this word by eight places (e.g, the bit in position [18] is shifted to position [26]), or does not shift these bits, depending on the value of the control signal received by multiplexer 55 from circuit 60.

Multiplexer stage 56 comprises forty identical multiplexers connected as shown, each having two inputs (receiving different bits) and one output (for asserting a selected one of the two inputs). Each of these multiplexers selects one of its two inputs in response to a control signal (labeled "[4]" in FIG. 7) from circuit 60. Multiplexer stage 56 receives the forty bits of the output word from multiplexer stage 55, and either shifts the bits of this word by sixteen places (e.g, the bit in position [3] is shifted to position [19]), or does not shift these bits, depending on the value of the control signal received by multiplexer stage 56 from circuit 60.

Thus, by selectively controlling various subsets of series-connected multiplexer stages 52, 53, 54, 55, and 56, the bits of the input word can be shifted by any number of places from zero to thirty-one. For example, by controlling only multiplexer stage 52 and 55 to execute non-zero shifts (so stage 52 executes a one-bit shift, stage 55 executes an eight-bit shift, and the other stages do not shift the bits that they receive), the bits of the input word are shifted by a total of nine places. A shift by an additional one bit (one place) is accomplished by circuit 57. However, the output of circuit 57 is selected only in the case of a right shift (or rotation to the right). Thus, the FIG. 7 circuit can shift the bits of a forty-bit input word received thereby by any number of places from one to thirty-two (for a right shift), or from zero to thirty-one (for a left shift).

The rotated or shifted data value output from multiplexer 59 of the FIG. 7 circuit undergoes final processing in bit replacement circuitry within circuit M2, depending on whether a rotation, arithmetic shift, or logical shift operation has been performed thereon (and depending on whether the input word received by the FIG. 7 circuit was selected by circuit M3 from unit 41 or from bus LB2. The bit replacement circuitry does not alter any of the forty bits of the shifted data value asserted at the output of multiplexer 59 at the end of an arithmetic shift or logical shift operation, or any of the forty bits of the shifted or rotated data value asserted at the output of multiplexer 59 in response to an input word selected by circuit M3 from bus LB2. At the end of a rotate operation (where the input word received by the FIG. 7 circuit was selected by circuit M3 from unit 41, and where the FIG. 7 circuit has rotated to the right the bits of a portion of such input word indicative of an input data value from bus DB1), a preferred implementation of the bit replacement circuitry within circuit M2 replaces the 16 "high word" bits (in bit locations [31;16]) of the rotated 40-bit data value (asserted at the output of multiplexer 59) with the "low word" bits (and the sixteen "low word" bits are replaced by "0"). At the end of a rotate operation (where the input word received by the FIG. 7 circuit was selected by circuit M3 from unit 41, and where the FIG. 7 circuit has rotated to the left the bits of a portion of such input word indicative of an input data value from bus DB1), a preferred implementation of the bit replacement circuitry within circuit M2 replaces the lowest 16 bits (in bit locations [15;0]) of the rotated 40-bit data value (asserted at the output of multiplexer 59) with zero bits (and the sixteen "high word" bits determine the rotated data value).

As described, the FIG. 7 circuit (including the preferred circuitry of FIG. 9) is capable of executing a selected one of left rotation or right rotation (by a selected number of places) of bits of a data word in response to a single control signal (in the sense that the single control signal is a set of control bits received by the FIG. 7 circuit during a single cycle of an instruction pipeline (i.e., the pipeline implemented by the FIG. 5 system). This embodiment of the inventive circuit routes received control bits (e.g., bits of signal SHIFT) and additional control bits that it generates in response to the received control bits (e.g., control bits that differentiate between an arithmetic shift, a logical shift, and a rotate) to appropriate ones of the circuit's elements during the same pipeline cycle. This embodiment of the invention completely executes the rotation specified by the received control bits during the pipeline cycle in which it receives these control bits.

Preferred embodiments of the input shifting circuit and digital processing system of the invention have been described with reference to FIGS. 1 and 3–9. Although these embodiments have been described in some detail, it is contemplated that many changes from (and variations on) these embodiments can be made without departing from the spirit and scope of the invention as defined by the appended claims.

What is claimed is:

1. A circuit having a single branch, which is controllable to implement a selected one of a left shift of bits comprising a data word, and a right shift of bits comprising the data word, said circuit including:

inversion circuitry for selectively inverting the order of bits of the data word, wherein the inversion circuitry asserts an input word in response to the data word, the input word is identical to the data word when the inversion circuitry operates in a first mode, and the order of bits of the input word is reversed relative to the order of bits of the data word when the inversion circuitry operates in a second mode; and a single branch circuit having a first input which receives the input word, a second input which receives a signed 2's complement shift value consisting of a sign bit and magnitude bits, an output, and shifting means, responsive to a received 2's complement shift value, for shifting bits of the input word by a selectable number of places to generate a shifted word, and asserting the shifted word to the output;

the shifting means including a set of series-connected multiplexer stages and a shift-amount generating circuit which receives the 2's complement shift value and selectively asserts as a shift-amount output either the magnitude bits or a 1's complement of the magnitude bits, the shift-amount output being coupled to control-signal inputs of the series-connected multiplexer stages;

the shifting means further including a shift-by-one-bit circuit having a data input coupled to the output of the single branch circuit and having a data output, the shift-by-one circuit further having a control input coupled to the sign bit for selectively asserting, in response to the value of the sign bit, either its data input or a one-bit shift of its data input at its data output.

2. The circuit of claim 1, wherein the input word consists of N bits, where N is an integer, and each stage of the set of multiplexer stages includes:

a set of N multiplexer circuits connected in parallel, each of said multiplexer circuits having two input terminals and one output terminal for asserting a bit received at a selected one of the input terminals.

3. The circuit of claim 2, wherein N=40, and the set of multiplexer stages consists of a first stage, a second stage, a third stage, a fourth stage, and a fifth stage.

4. The circuit of claim 3, wherein at least one of the multiplexer circuits of the first stage includes:

a first input terminal connected to receive a first bit of the input word; and a second input terminal connected to receive a second bit of the input word, where said first bit and said second bit are adjacent bits of the input word.

5. The circuit of claim 4, wherein the first stage outputs a first processed word in response to the input word, and at least one of the multiplexer circuits of the second stage includes:

a first input terminal connected to receive a first bit of the first processed word; and a second input terminal connected to receive a second bit of the first processed word, where said first bit and said second bit are separated by only one bit of the first processed word.

6. The circuit of claim 5, wherein the second stage outputs a second processed word in response to the first processed word, and at least one of the multiplexer circuits of the third stage includes:

a first input terminal connected to receive a first bit of the second processed word; and a second input terminal connected to receive a second bit of the second processed word, where said first bit and said second bit are separated by three bits of the second processed word.

7. The circuit of claim 1 wherein said circuit is also controllable to implement a selected one of a left rotation of bits comprising the data word, and a right rotation of bits comprising the data word, and wherein the shifting means includes:

bit selection circuitry, operable in a first state in which said bit selection circuitry asserts bits needed for executing the left rotation to the input of each of the multiplexer stages, and operable in a second state in which said bit selection circuitry asserts bits needed for executing the right rotation to the input of each of the multiplexer stages.

8. The circuit of claim 1, also including:

circuitry for receiving the shifted word and selectively inverting the order of bits of the shifted word.

9. A digital signal processing system, for executing instructions and thereby processing data, said system including:

program control means for receiving a sequence of the instructions and generating control signals for controlling execution of the instructions in said sequence; and processing means for processing words of said data in response to at least some of the control signals, wherein the processing means includes a circuit having a single branch, which is controllable to implement a selected one of a left shift of bits of one of the words, a right shift of bits of said one of the words, a left rotation of bits of said one of the words, and a right rotation of bits of said one of the words, said circuit including:

circuitry for selectively inverting the order of bits of said one of the words, thereby generating an input word; and a single branch circuit having a first input which receives the input word, a second input which receives a signed 2's complement shift value consisting of a sign bit and magnitude bits, an output, and shifting means, responsive to a received 2's complement shift value, for shifting bits of the input word by a selectable number of places to generate a shifted word and asserting the shifted word to the output;

the shifting means including a set of series-connected multiplexer stages and a shift-amount generating circuit which receives the 2's complement shift value and selectively asserts as a shift-amount output either the magnitude bits or a 1's complement of the magnitude bits, the shift-amount output being coupled to control-signal inputs of the series-connected multiplexer stages;

the shifting means further including a shift-by-one-bit circuit having a data input coupled to the output of the single branch circuit and having a data output, the shift-by-one circuit further having a control input coupled to the sign bit for selectively asserting, in response to the value of the sign bit, either its data input or a one-bit shift of its data input at its data output.

10. The system of claim 9, wherein the input word consists of N bits, where N is an integer, and each stage of the set of multiplexer stages includes:

a set of N multiplexer circuits connected in parallel, each of said multiplexer circuits having two input terminals and one output terminal for asserting a bit received at a selected one of the input terminals.

11. The system of claim 10, wherein N=40, and the set of multiplexer stages consists of a first stage, a second stage, a third stage, a fourth stage, and a fifth stage.

12. The system of claim 11, wherein at least one of the multiplexer circuits of the first stage includes:

a first input terminal connected to receive a first bit of the input word; and a second input terminal connected to receive a second bit of the input word, where said first bit and said second bit are adjacent bits of the input word.

13. The system of claim 12, wherein the first stage outputs a first processed word in response to the input word, and at least one of the multiplexer circuits of the second stage includes:

a first input terminal connected to receive a first bit of the first processed word; and a second input terminal connected to receive a second bit of the first processed word, where said first bit and said second bit are separated by at least one bit of the first processed word.

14. A circuit, which operates in response to a signed 2's complement number asserted as a single control signal to implement a selected one of a left rotation of bits comprising a data word and a right rotation of bits comprising the data word, said circuit including:

inversion circuitry for selectively inverting the order of bits of the data word in response to a first subset of control bits of the single control signal, which asserts an input word in response to the data word, wherein the input word is identical to the data word when the inversion circuitry operates in a first mode, and the order of bits of the input word is reversed relative to the order of bits of the data word when the inversion circuitry operates in a second mode;

a set of series-connected multiplexer stages, each of said stages having an input and an output, wherein the input of a first one of the stages receives the input word, and the output of a final one of the stages asserts a rotated word whose bits include bits of the input word that have been rotated by a selectable number of places;

a shift-amount generating circuit which receives a second subset of control bits of the single control signal and selectively asserts, in response, either the second subset of control bits or a 1's complement of the second subset of control bits as a shift-amount output, the shift-amount output being coupled to control-signal inputs of the series-connected multiplexer stages whereby bits of the input word are rotated by the selectable number of places; and a shift-by-one-bit circuit having a data input coupled to the output of the final one of the series-connected multiplexer stages and having a data output, the shift-by-one circuit further having a control input coupled to the first subset of control bits for selectively asserting either its data input or a one-bit shift of its data input at its data output.

15. The circuit of claim 14, also including:

bit selection circuitry connected to the set of series-connected multiplexer stages, wherein the bit selection circuitry is operable in a first state in which said bit selection circuitry asserts bits needed for executing said left rotation to the input of each of the multiplexer stages, and wherein the bit selection circuitry is operable in a second state in which said bit selection circuitry asserts bits needed for executing said right rotation to the input of each of the multiplexer stages.

* * * * *

UNITED STATES PATENT AND TRADEMARK OFFICE
CERTIFICATE OF CORRECTION

PATENT NO : 5,978,822
DATED : November 2, 1999
INVENTOR(S): Juwana A. Muwafi et al.

It is certified that error appears in the above-identified patent and that said Letters Patent is hereby corrected as shown below:

On the title page, item [75] Inventors: "Howard W. Neff" should read - - Harlan W. Neff - -.

Signed and Sealed this

Twentieth Day of March, 2001

Attest:

NICHOLAS P. GODICI

Attesting Officer

Acting Director of the United States Patent and Trademark Office